United States Patent
Tada et al.

(10) Patent No.: US 9,201,176 B2
(45) Date of Patent: Dec. 1, 2015

(54) LIGHT-SHIELDING FILM

(75) Inventors: Kenta Tada, Ohtsu (JP); Emi Kubo, Ohtsu (JP); Yu Yamamoto, Ohtsu (JP)

(73) Assignee: TOYOBO CO., LTD., Osaka (JP)

( * ) Notice: Subject to any disclaimer, the term of this patent is extended or adjusted under 35 U.S.C. 154(b) by 576 days.

(21) Appl. No.: 13/698,761

(22) PCT Filed: May 10, 2011

(86) PCT No.: PCT/JP2011/060709
§ 371 (c)(1),
(2), (4) Date: Nov. 19, 2012

(87) PCT Pub. No.: WO2011/145473
PCT Pub. Date: Nov. 24, 2011

(65) Prior Publication Data
US 2013/0065039 A1  Mar. 14, 2013

(30) Foreign Application Priority Data
May 20, 2010 (JP) ................................ 2010-116003

(51) Int. Cl.
| | |
|---|---|
| *C08K 3/04* | (2006.01) |
| *C08K 3/36* | (2006.01) |
| *C08K 5/5415* | (2006.01) |
| *C08K 7/00* | (2006.01) |
| *G02B 5/00* | (2006.01) |
| *G03B 9/00* | (2006.01) |
| *C08L 79/08* | (2006.01) |
| *C09D 179/08* | (2006.01) |
| *C08G 73/14* | (2006.01) |

(52) U.S. Cl.
CPC ................ *G02B 5/003* (2013.01); *C08G 73/14* (2013.01); *C08K 3/04* (2013.01); *C08K 3/36* (2013.01); *C08L 79/08* (2013.01); *C09D 179/08* (2013.01); *G03B 9/00* (2013.01)

(58) Field of Classification Search
CPC ............ G02B 5/003; C08K 3/36; C08K 3/04; C08G 73/14; C08L 79/08; C09D 179/08
See application file for complete search history.

(56) References Cited

U.S. PATENT DOCUMENTS

| | | | | | |
|---|---|---|---|---|---|
| 3,852,106 | A | * | 12/1974 | Incremona et al. ............ | 428/383 |
| 6,441,083 | B1 | * | 8/2002 | Kuwamoto et al. ............ | 524/492 |
| 6,521,290 | B1 | * | 2/2003 | Kudo et al. .................... | 427/214 |

FOREIGN PATENT DOCUMENTS

| | | | |
|---|---|---|---|
| JP | 1-120503 | | 5/1989 |
| JP | 2-282731 | | 11/1990 |
| JP | 7-319004 | | 12/1995 |
| JP | 2003-29314 | | 1/2003 |
| JP | 2006-201268 | | 8/2006 |
| JP | 2008-251877 | | 10/2008 |
| JP | 2009271547 A | * | 11/2009 |
| WO | 2009/014264 | | 1/2009 |
| WO | 2011/062055 | | 5/2011 |

OTHER PUBLICATIONS

Machine translation of JP2009-271547. Retrieved Jul. 26, 2015.*
International Search Report issued Jun. 28, 2011 in International (PCT) Application No. PCT/JP2011/060709.

* cited by examiner

*Primary Examiner* — Prashant J Khatri
(74) *Attorney, Agent, or Firm* — Wenderoth, Lind & Ponack, L.L.P.

(57) ABSTRACT

An object of the present invention is to inexpensively manufacture a light-shielding film having excellent heat resistance and dimensional stability, having high light-shielding property and low glossiness and showing little variation in glossiness of the film. The present invention is to provide a light-shielding film containing a polyamide-imide resin, a black filler having average particle size of 0.01 to 1 μm and inorganic particles having average particle size of 0.1 to 10 μm, wherein content of the polyamide-imide resin is 55 to 91% by weight, content of the black filler is 1 to 10% by weight and content of the inorganic particles is 8 to 35% by weight in the light-shielding film.

8 Claims, No Drawings

LIGHT-SHIELDING FILM

TECHNICAL FIELD OF THE INVENTION

The present invention relates to a light-shielding film containing a polyamide-imide resin, a black filler and inorganic particles. More particularly, it relates to a light-shielding film which is excellent in terms of heat resistance, dimensional stability, low glossiness, light-shielding property, etc. and is advantageously used as an antireflective layer, etc. for aperture stop and shutter blades installed in a lens unit for digital video camera, mobile phone, onboard camera, etc., aperture stop for projector, aperture blade for aperture stop device for light quantity adjustment, optical instrument parts and insulating substrate.

BACKGROUND ART

In recent years, compact cameras and digital video cameras having high portability which are easily carried to anywhere and used at all times have been abundantly available in the market. As a result, there has been a demand for making the compact cameras and video camera which are lighter in weight, smaller in size and higher in performance. As a result of weight reduction, miniaturization and performance enhancement of optical instruments or, particularly, compact camera and digital video camera as such, there have been also a demand for weight reduction, miniaturization and performance enhancement for the constituting parts thereof.

Particularly in shutter blades and aperture blades used for optical instruments, there is a necessity for weight reduction as a result of the fact that shutter speed is becoming higher. Further, since it is necessary to shield the light by covering the front side of a picture-taking element such as CCD, light-shielding property is fundamentally necessary. Furthermore, reflectivity of the surface is desired to be low for preventing the leakage of light from the gaps among the blades. Still further, since temperature of inner side of the camera becomes high depending upon the actual using environment, heat resistance and dimensional stability are also demanded for shutter blades and aperture blades.

Up to now, thin plate of metal (such as SUS or Al) has been commonly used as a light-shielding film as such. In the case of a lens shutter for camera for example, metal plates are rubbed each other upon opening and closing the blade material and generate big noise when a light-shielding film of thin metal plate is used as the shutter blades and aperture blades. Similar noise is also generated in a projector. For reducing the noise, the blade is to be operated in low speed. In such a case, there is a problem that adjustment of light quantity cannot follow the changes in the image whereby the image becomes instable.

In view of the above problem and also in view of the weight reduction, use of a film based on synthetic resins as a substrate instead of thin metal plate is becoming the main stream. However, when an insulating synthetic resin film is used, there is a problem of sticking of dust due to the charge of static electricity whereby the light-shielding film is further demanded to have electric conductivity. In view of the above, the characteristics necessary for light-shielding film are said to be high light-shielding property, heat resistance, dimensional stability, low glossiness, electric conductivity, etc. In order to fulfill the characteristics of the light-shielding film as such, there have been proposals of using various materials and film structures.

For example, Patent Document 1 discloses a method for manufacturing a light-shielding film where a film in which carbon black is compounded with polyester film is sandblasted so as to make the film surface coarse and then an electrically conducting agent is applied thereto. Patent Document 2 proposes a light-shielding film where a light-shielding layer constituted from a binder resin, black fine powder having average particle size of not more than 1 µm, an organic filler having average particle size of 0.5 to 10 µm and a lubricant having average particle size of 0.1 to 10 µm is formed at least on one side of a substrate film. Patent Document 3 proposes a light-shielding film where a light-shielding layer constituted from thermosetting resin having Tg of not lower than 40° C. and having softening point of not lower than 80° C., black fine powder having average particle size of not more than 1 µm, an organic filler having average particle size of 0.5 to 10 µm and a lubricant having average particle size of 0.1 to 10 µm is formed at least on one side of a substrate film. Further, Patent Document 4 proposes a flexible printed circuit board having light-shielding property which is manufactured by application of a light-shielding ink comprising fine particles of silica having average particle size of 2 to 8 µm and aromatic polyamide-imide to a flexible printed circuit board.

PRIOR ART DOCUMENTS

Patent Documents

Patent Document 1: Japanese Patent Application Laid-Open (JP-A) No. 120503/89
Patent Document 2: Japanese Patent Application Laid-Open (JP-A) No. 319004/95
Patent Document 3: Japanese Patent Application Laid-Open (JP-A) No. 2003-29314
Patent Document 4: Japanese Patent Application Laid-Open (JP-A) No. 2008-251877

DISCLOSURE OF THE INVENTION

Problem that the Invention is to Solve

However, the method of Patent Document 1 has a problem of poor heat resistance and dimensional stability due to the use of polyester film as a base. In the methods of Patent Documents 2 and 3, there is a big problem in addition to poor heat resistance and dimensional stability that the difference in light-shielding property and in glossiness is noted between both sides of the film. In Patent Documents 2 and 3, there is a further problem that, even when light-shielding layers are formed on both sides of the substrate film, glossiness becomes high on the cross section of the polyester-based film and variation in the glossiness in the thickness direction is resulted whereby no sufficient low glossiness is achieved.

In Patent Document 4, there is also a problem that variation in the dispersibility in the thickness direction is resulted whereby non-uniform glossiness is resulted due to the small adding amount of silica.

An object of the present invention is to solve the above-mentioned problems. Thus, an object of the present invention is to provide a light-shielding film having excellent heat resistance and dimensional stability, having high light-shielding property and low glossiness and showing little variation in glossiness in both sides and cross section of the film.

Means for Solving the Problem

In order to solve the above problems, the following light-shielding film is provided by the present invention:

(1) A light-shielding film containing a polyamide-imide resin, a black filler having average particle size of 0.01 to 1 μm and inorganic particles having average particle size of 0.1 to 10 μm, characterized in that, content of the polyamide-imide resin is 55 to 91% by weight, content of the black filler is 1 to 10% by weight and content of the inorganic particles is 8 to 35% by weight in the light-shielding film.

(2) The light-shielding film according to (1), wherein the black filler is carbon black.

(3) The light-shielding film according to (1) or (2), wherein the inorganic particles are silica.

(4) The light-shielding film according to any of (1), (2) and (3), wherein the inorganic particles are silica subjected to a surface treatment with silicone oil and/or a silane coupling agent.

(5) The light-shielding film according to any of (1) to (4), wherein the film further contains a dispersing agent for the black filler and/or the inorganic particles in addition to the polyamide-imide resin, the black filler and the inorganic particles.

(6) The light-shielding film according to (5), wherein amount of the dispersing agent to 100 parts by weight of the black filler and/or the inorganic particles is 1 to 50 part(s) by weight.

(7) The light-shielding film according to any of (1) to (6), wherein the polyamide-imide resin contains trimellitic acid anhydride as an acid component and 3,3'-dimethyl-4,4'-diaminobiphenyl or a diisocyanate corresponding thereto as an amine component.

(8) The light-shielding film according to any of (1) to (7), wherein the polyamide-imide resin contains trimellitic acid anhydride, benzophenonetetracarboxylic acid di-anhydride and biphenyltetracarboxylic acid di-anhydride as an acid component and 3,3'-dimethyl-4,4'-diaminobiphenyl or a diisocyanate corresponding thereto as an amine component.

(9) The light-shielding film according to any of (1) to (8), wherein the thickness of the light-shielding film is 5 to 100 μm.

(10) The light-shielding film according to any of (1) to (9), wherein the glossiness of both sides of the light-shielding film measured in accordance with a method for measuring the mirror plane glossiness mentioned in JIS Z8741-1997 is not more than 40.

(11) A light-shielding film, characterized in that, the film contains a polyamide-imide resin, a black filler having average particle size of 0.01 to 1 μm and inorganic particles having average particle size of 0.1 to 10 μm in the contents as shown in the following (i) to (iii), respectively and also that the film is in a single layer structure:

(i) content of the polyamide-imide resin is 55 to 91% by weight;

(ii) content of the black filler having average particle size of 0.01 to 1 μm is 1 to 10% by weight; and (iii) content of the inorganic particles having average particle size of 0.1 to 10 μm is 8 to 35% by weight.

Advantages of the Invention

In accordance with the light-shielding film of the present invention, the film contains a polyamide-imide resin, a black filler having average particle size of 0.01 to 1 μm and inorganic particles having average particle size of 0.1 to 10 μm. Further, content of the polyamide-imide resin is 55 to 91% by weight, content of the black filler is 1 to 10% by weight and content of the inorganic particles is 8 to 35% by weight in the light-shielding film. Thus, it is possible to provide a light-shielding film where various properties such as heat resistance, dimensional stability, high light-shielding property and low glossiness are well-balanced.

Specifically, since the light-shielding film of the present invention contains a polyamide-imide resin, its heat resistance and dimensional stability are excellent. Further, since it contains 8 to 35% by weight of inorganic particles having average particle size of 0.1 to 10 μm, it is excellent in low glossiness and the variation in both sides, cross section and thickness direction thereof is suppressed. Furthermore, since it contains 1 to 10% by weight of a black filler having average particle size of 0.01 to 1 μm, its light-shielding property is excellent. When the light-shielding film of the present invention is used, it is now possible to easily manufacture the optical material use where light-shielding characteristic is needed or, particularly, an antireflective layer, etc. for aperture stop and shutter blades installed in a lens unit for digital video camera, mobile phone, onboard camera, etc., aperture stop for projector, aperture blade for aperture stop device for light quantity adjustment, optical instrument parts and insulating substrate.

BEST MODE FOR CARRYING OUT THE INVENTION

A light-shielding film of the present invention contains a polyamide-imide resin, a black filler having average particle size of 0.01 to 1 μm and inorganic particles having average particle size of 0.1 to 10 μm, wherein content of the polyamide-imide resin is 55 to 91% by weight, content of the black filler is 1 to 10% by weight and content of the inorganic particles is 8 to 35% by weight in the light-shielding film.

In the present specification, content of the polyamide-imide resin, content of the black filler and content of the inorganic particles stand for the content (in % by weight) of each of them when the sum of the polyamide-imide resin, the black filler and the inorganic particles is 100% by weight.

With regard to shielding of light in the light-shielding film of the present invention, optical density of the light-shielding film is measured by an optical densitometer TD-904 manufactured by Macbeth and, when the optical density is 5 or more, it is judged to be good (light-shielding property is available) while, when the optical density is less than 5, it is judged to be poor (no light-shielding property is available). Qualitatively, it is such a light-shielding property where the light does not transmits the film when a fluorescent lamp of 1000-lux light source is placed at the position of 50 cm from the film and judgment is done by naked eye whether the light of the fluorescent lamp transmits the film.

The "light-shielding film" of the present invention is formed using a black resin composition containing "polyamide-imide resin", "black filler" and "inorganic particles". If necessary, "dispersing agent for black filler and/or inorganic particles" may be added to the black resin composition of the present invention. Each of them will be illustrated as follows:

<Polyamide-Imide Resin>

The light-shielding film of the present invention contains 55 to 91% by weight of polyamide-imide resin. More preferably, it contains 65 to 87% by weight of polyamide-imide resin.

The polyamide-imide resin used in the present invention may be synthesized by a conventionally known method. Examples thereof include isocyanate method and amine method (acid chloride method, low-temperature solution polymerization method, room-temperature solution polymerization method, etc.). The polyamide-imide used in the present invention is preferred to be soluble in organic solvents. Further, in an industrial view, it is preferred that the solution during polymerization per se can be used for coating. Therefore, an isocyanate method is preferred.

In an isocyanate method, the polyamide-imide resin can be synthesized by means of heating polycondensation of an acid component such as tricarboxylic acid anhydride, dicarboxylic acid or tetracarboxylic acid anhydride with diisocyanate in an organic solvent. Examples of the solvent used for the polymerization include amide-type solvent and ester-type solvent such as N-methyl-2-pyrrolidone, N,N'-dimethylacetamide, tetramethylurea, 1,3-dimethyl-2-imidazolidone and γ-butyrolactone.

In the present invention, conventionally known polyamide-imide resin may be used and a preferred embodiment is a polyamide-imide resin containing the formula (1). With regard to the polyamide-imide resin containing the formula (1), a preferred one is a polyamide-imide resin containing trimellitic acid anhydride as an acid component and 3,3'-dimethyl-4,4'-diaminobiphenyl or a diisocyanate corresponding thereto (o-tolidine diisocyanate) as an amine component.

Further, in view of dimensional stability, a polyamide-imide resin having a repeating unit comprising the formulae (1), (2) and (3) is preferred and a polyamide-imide resin where the copolymerizing ratio thereof is {formula (1)}/{formula (2)}/{formula (3)}=49 to 98/1 to 50/1 to 50 (in molar ratio) is more preferred. Still more preferably, the ratio is {formula (1)}/{formula (2)}/{formula (3)}=55 to 90/5 to 40/5 to 30 (in molar ratio), and most preferably, the ratio is {formula (1)}/{formula (2)}/{formula (3)}=65 to 85/10 to 30/5 to 20 (in molar ratio).

When the formula (1) is 98 molar % or more and each of the formulae (2) and (3) is lower than each of the lower limits thereof, an object of the present invention is still achieved but heat resistance and dimensional stability tend to lower. When the formula (1) is not contained or is less than 49 molar % and each of the formulae (2) and (3) is more than each of the upper limits, solubility in organic solvents becomes poor and dispersing processability tends to lower. In addition, glossiness and light-shielding property become poor and variation in both sides and in a thickness direction tends to become big.

Particularly preferred combination is such a case where a monomer having a di-substituted biphenylene group such as dimethyldiaminobiphenyl is used, an acid components is a combination of trimellitic acid anhydride, 3,3',4,4'-benzophenone-tetracarboxylic acid di-anhydride and 3,3',4,4'-biphenyl-tetracarboxylic acid di-anhydride and an amine component is 3,3'-dimethyl-4,4'-diaminobiphenyl or a diisocyanate corresponding thereto (o-tolidine diisocyanate).

[formula 1]

formula (1)

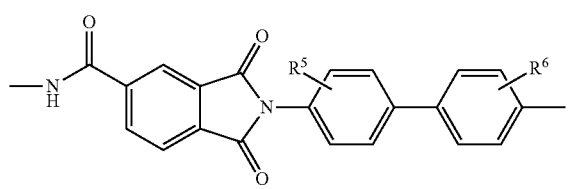

(In the formula, $R^5$ and $R^6$ may be same or different and each of them is hydrogen or an alkyl or alkoxy group having 1 to 4 carbon(s).)

[formula 2]

formula (2)

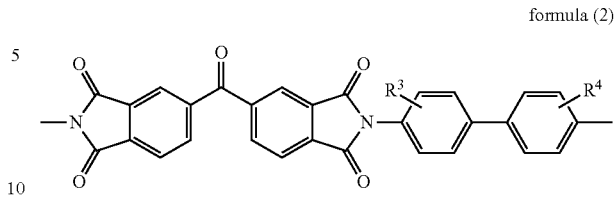

(In the formula, $R^3$ and $R^4$ may be same or different and each of them is hydrogen or an alkyl or alkoxy group having 1 to 4 carbon(s).)

[formula 3]

formula (3)

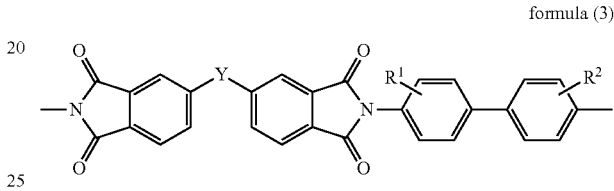

(In the formula, $R^1$ and $R^2$ may be same or different and each of them is hydrogen or an alkyl or alkoxy group having 1 to 4 carbon (s). Y is a direct bond (biphenyl bond) or an ether bond (—O—).)

Molecular weight of the polyamide-imide resin is preferred to be that which corresponds to 0.3 to 2.5 dl/g in terms of logarithmic viscosity at 30° C. in N-methyl-2-pyrrolidone (polymer concentration: 0.5 g/dl) and, more preferably, that which corresponds to 0.5 to 2.0 dl/g. When the logarithmic viscosity is less than 0.3 dl/g, the mechanical characteristics may become insufficient upon making into a molded product such as film while, when it is more than 2.0 g/dl, the solution viscosity becomes high whereby the molding processing may become difficult. As to an appropriate solution viscosity, the B type viscosity at 25° C. is preferred to be within a range of 1 to 1,000 dPa·s. When said viscosity is out of the above range, the coating property may lower.

<Black Filler>

As to the black filler, there may be used carbon black (such as furnace black or lampblack), graphite, etc. The black filler may be an electroconductive black filler.

A specific example of the black filler is carbon black (MA 100R manufactured by Mitsubishi Chemical, etc.) although this is non-limitative.

Average particle size of the black filler is not more than 1 μm, preferably not more than 0.8 μm, and most preferably not more than 0.5 μm. Lower limit of the average particle size is usually 0.01 μm. The light-shielding property lowers when the average particle size is more than 1 μm. Therefore, that is not preferred. The smaller the particle size, the better but, in practice, 20 nm or more is sufficient. The average particle size of the black filler is sufficient when it is 0.01 μm to 1 μm. Amount of the black filler is 1 to 10% by weight, preferably 2 to 8% by weight, and more preferably 2 to 6% by weight. Even when the amount of the black filler is 1 to 8% by weight, that is preferred as well. When the amount of the black filler is less than 1% by weight, the light-shielding property and the electroconductive property lower while, when it is more than 10% by weight, the mechanical characteristic lowers and that is not preferred.

Average particle size of the black filler may be determined by arithmetic calculation after observing under an electron microscope with a measuring magnification of about 50,000 to 100,000-fold. In the observed visual field, about 1,000 particles are measured randomly. As to the measuring place, it is preferred to select the area where the object can be separated as particles. Incidentally, when the black filler is not nearly circular, a value where the sum of long and short diameters is divided by two may be adopted as a particle size.

<Inorganic Particles>

As to the inorganic particles used in the present invention, the conventionally known titanium oxide, calcium carbonate, alumina, silica, etc. may be used. Preferred one is silica and particularly preferred one is that which is subjected to a hydrophobic treatment with silicone oil or a silane coupling agent. As a result of a hydrophobic treatment, cohesive force of silica lowers and affinity to polyamide-imide resin is enhanced whereby it is possible to prepare a light-shielding film having excellent low glossiness and light-shielding property and having little variation in both sides and in thickness direction. As to the silicone oil and the silane coupling agent, the conventionally known ones such as polydimethyl siloxane, amine-type silane coupling agent or epoxy-type silane coupling agent may be used.

As a specific example of silica, there may be used hydrophobic silica (such as Sylophobic 505 manufactured by Fuji Silicia) but that is non-limitative.

Average particle size of the inorganic particles is 0.1 to 10 µm, preferably 1 to 7 µm, and most preferably 2.5 to 5.5 µm. When the average particle size is smaller than 0.1 µm, surface glossiness becomes high while, when it is larger than 10 µm, mechanical strength of the light-shielding film lowers. Amount of the inorganic particles is 8 to 35% by weight, preferably 9 to 25% by weight, and most preferably 9 to 22% by weight. When it is less than 8% by weight, glossiness of the film surface increases and prevention of light reflection on the cross section (the cross section or side face part of the circumference of a light-shielding material such as a shutter made of the black resin composition) lowers whereby that disturbs the object of making the performance as a shutter or an aperture stop high and that is not preferred. When it is more than 35% by weight, it lowers the mechanical characteristics of the light-shielding film and also results in a high production cost.

An average particle size of the inorganic particles may be measured by a laser diffraction scattering method using a laser diffraction granule distribution measuring apparatus (SALD-2200 manufactured by Shimadzu) where methanol is used as a dispersing medium.

<Dispersing Agent for Black Filler and/or Inorganic Particles>

If necessary, a dispersing agent for black filler and/or inorganic particles may be added to the black resin composition of the present invention. As to the dispersing agent, that which comprising a synthetic polymer is preferred. Examples thereof include polyurethane resin, polyester resin, polyether resin, acrylic resin, polyolefin glycol resin (such as polyethylene glycol or polypropylene glycol), styrene-acrylic acid resin, hydroxyl group-containing carboxylate, acid ester of polyaminoamide phosphate, salt of polycarboxylic acid, unsaturated acid ester, modified polyurethane, grafted polyurethane, modified polyether, grafted polyether, modified polyester, grafted polyester and modified polyacrylate. Preferred examples include polyester- and/or polyether-modified or grafted polyurethane, acrylic resin, polyolefin glycol and a mixture of acrylic resin with polyolefin glycol. Adding amount to 100 parts by weight of the black filler and/or the inorganic particles is preferred to be 1 to 50 part(s) by weight. When the adding amount is less than the above range, dispersing property of the black filler and/or the inorganic particles lowers whereby uniform dispersing may become difficult. When it is more than the above range, mechanical characteristics may become low.

As a specific example of the silica dispersing agent, there may be used a silica dispersing agent (modified acrylic block copolymer, BYK Additives & Instruments, DISPER-BYK2008) although this is non-limitative. As a specific example of the carbon black dispersing agent, there may be used a carbon black dispersing agent (a macromolecular copolymer having a pigment-affinitive group, BYK Additives & Instruments, BYK9077) although this is non-limitative.

In the light-shielding film of the present invention, thickness of the film is preferably 5 to 100 µm, more preferably 8 to 50 µm, and most preferably 10 to 25 µm. When the film thickness is less than 5 µm, the light-shielding property lowers and the mechanical property (such as film strength) and the handling property are inferior and there is a possibility of resulting in film defect such as detachment of silica particles. When the film thickness is more than 100 µm, the characteristic property (such as flexibility) and the processing ability (drying property and coating property) tend to lower.

In the light-shielding film of the present invention, there is no particular need for a film which acts as a substrate. For example, the light-shielding film becomes in a structure of two or more layers when a substrate film is needed. The light-shielding film of the present invention is in a single layer structure. One of the advantages of a single layer structure is that the film thickness can be made thin. When the film thickness is thin, the characteristic property (such as flexibility) and the processing property (drying property and coating property) become good. Another advantage is that the glossiness at the cross section of the film becomes low and variation in the thickness direction does not happen as well. The reason why the above is achieved is that the present inventors have intensively investigated and predicted a light-shielding film containing a polyamide-imide resin. Another reason is that the present inventors have found the content of a polyamide-imide resin, the content of a black filler having average particle size of 0.01 to 1 µm and the content of the inorganic particles having average particle size of 0.1 to 10 µm. Still another reason is that the present inventors have found the type, the compounding rate, etc. of the polyamide-imide resin.

<Method for the Manufacture of Light-Shielding Film>

The light-shielding film of the present invention is formed using a black resin composition containing a polyamide-imide resin, a black filler and inorganic particles. The black resin composition can be prepared by such a manner that a polyamide-imide resin is compounded with a black filler, inorganic particles and an organic solvent using an appropriate combination of a stirrer, an impeller-type disperser such as dissolver, a ball mill, a beads mill, a three-roll mill, etc. As to the organic solvent, an organic solvent used in the polymerization may be used. The light-shielding film may be manufactured according to the conventionally known method for the manufacture of film. For example, the above black resin composition is applied on a support, dried, subjected to a thermal treatment and detached whereby the light-shielding film is manufactured.

There is no particular limitation for the methods of application, drying and thermal treatment and the conventionally known ones may be adopted. For example, the application is done on a support such as an endless belt, a drum or a carrier film using a roll coater, a knife coater, a doctor blade coater, a gravure coater, a die coater or a reverse coater and the applied membrane is dried. In some cases, film is detached from the support and subjected to a thermal treatment to give the light-shielding film of the present invention.

In the light-shielding film of the present invention, glossiness of both sides of the film is preferred to be not more than 40. When the glossiness is more than 40, no sufficiently low glossiness is achieved and a reducing effect for the generation of ghost on the film surface may lower. Glossiness of the film may be evaluated by measuring the intensity of the light reflected at an angle of reflection of 60° upon irradiation of a light source at an angle of incidence of 60° in accordance with a method for measuring the mirror plane glossiness mentioned in JIS Z8741-1997. In the angle of incidence used here, a direction of right angle to the irradiated surface of light is defined as 0°. Measurement may be conducted using a measuring instrument such as VG 200 Glossmeter of Nippon Denshoku.

In the light-shielding film of the present invention, it is preferred that the heat resistance is excellent and the glass transition temperature measured by TMA is not lower than 150° C., more preferably not lower than 200° C., and most preferably not lower than 250° C.

In the light-shielding film of the present invention, its dimensional changing rate is preferably not more than 0.1%, more preferably not more than 0.07%, and most preferably not more than 0.05%. The dimensional changing rate is calculated in such a manner that, in accordance with IPC-FC 241 (IPC-TM-650, 2.2.4 (c)), a film is completely dried and the size of a sample being allowed to stand at 25° C. for 24 hours and the size of a sample being allowed to stand at 25° C. for 24 hours after subjecting to a thermal treatment at 200° C. for 30 minutes are measured and the resulting changing rate is expressed in terms of percentage.

In the light-shielding film of the present invention, a light-shielding film having excellent mechanical characteristics is achieved by using the polyamide-imide as the resin and adding appropriate amounts of the black filler and the inorganic particles thereto. When the amounts of the black filler and the inorganic particles are too much, there may be a risk of lowering the mechanical characteristics as mentioned above whereby that is not preferred. In the light-shielding film of the present invention, it is preferred that the strength is 150 MPa to 300 MPa, elongation is 10% to 100% and elastic modulus is 4.5 GPa to 10 GPa.

EXAMPLES

As hereunder, the present invention will be more specifically illustrated by way of Examples although the present invention is not limited to those Examples only.

<Average Particle Size>

Average particle size of the black filler was determined by arithmetic calculation after observing under an electron microscope with a measuring magnification of 100,000-fold. In the observed visual field, about 1,000 particles were measured randomly. Incidentally, when the black filler is not nearly circular, a value where the sum of long and short diameters is divided by two was adopted as a particle size.

An average particle size of the inorganic particles was measured by a laser diffraction scattering method using a laser diffraction granule distribution measuring apparatus (SALD-2200 manufactured by Shimadzu) where methanol is used as a dispersing medium.

<Glass Transition Temperature>

Glass transition temperature of the light-shielding film of the present invention was measured by a tensile load method using TMA (thermo-mechanical analysis; manufactured by Seiko Instruments, Inc.) under the following conditions:
Load: 5 g
Sample size: 4 (width)×20 (length) mm
Temperature-raising rate: 10° C./minute
Atmosphere: nitrogen <Glossiness>

With regard to the glossiness of the light-shielding film, intensity of the light reflected at an angle of reflection of 60° was measured after irradiating the light source at the angle of incidence of 60° in accordance with a method for measuring the mirror plane glossiness mentioned in JIS Z8741-1997. In the angle of incidence used here, a direction of right angle to the irradiated surface of light is defined as 0°. Measurement was conducted using a VG 200 Glossmeter of Nippon Denshoku. Both sides (say, side A and side B) of the light-shielding film were measured where the side B was a support side upon application and drying.

With regard to the glossiness of the cross section of the light-shielding film, the cross section of the light-shielding film was observed under an optical microscope (×500) and the degree of reflection was evaluated. When the glossiness was low, it was marked "good" (o) and, when the glossiness was not low, it was marked "no good" (x). Incidentally, there is a tendency that, when the difference in glossiness between the film surfaces A and B is large, the glossiness of the cross section of the film becomes no good. Accordingly, it is also possible to judge the glossiness of the cross section of the light-shielding film by means of the glossiness difference between the film surfaces A and B. (When the glossiness difference between the surfaces A and B is 40 or more, there is a tendency of becoming "no good" (x).)

<Light-Shielding Property>

Optical density of the light-shielding film was measured using an optical densitometer manufactured by Macbeth.

When the optical density was 5 or more, it was judged to be "good" (o) and, when it was less than 5, it was judged to be "no good" (x).

<Tensile Test>

Tensile strength, tensile elongation and elastic modulus of the light-shielding film were measured using a tensile tester ("Tensilon Tensile Tester" (trade name) manufactured by Toyo Baldwin) under the following conditions:
Sample size: 10 (width)×40 (length) mm
Crosshead rate: 20 mm/minute
Temperature: 23° C.

<Dimensional Changing Rate>

Dimensional changing rate was calculated in such a manner that, in accordance with IPC-FC 241 (IPC-TM-650, 2.2.4 (c)), a film was completely dried and the size of a sample being allowed to stand at 25° C. for 24 hours and the size of a sample being allowed to stand at 25° C. for 24 hours after subjecting to a thermal treatment at 200° C. for 30 minutes were measured and the resulting changing rate was expressed in terms of percentage.
Sample size: 200 mm×200 mm <Thickness of the Film>

Thickness of the sample film was measured at three points using a digital length-measuring machine (NH-15M manufactured by Nikon) and the mean value thereof was determined.

Example 1

A polyamide-imide resin being soluble in organic solvents synthesized from trimellitic acid anhydride (80 molar %), benzophenonetetracarboxylic acid di-anhydride (12.5 molar %), 3,3',4,4'-biphenyltetracarboxylic acid di-anhydride (7.5 molar %) and o-tolidine diisocyanate (100 molar %) was dissolved in N-methyl-2-pyrrolidone so as to make the polymer concentration 10%.

Said resin, hydrophobic silica having average particle size of 3.9 µm (Sylophobic 505 manufactured by Fuji Silicia) subjected to a surface treatment with silicone oil (dimethylsiloxane) and carbon black (MA 100R manufactured by Mitsubishi Chemical) having average particle size of 24 nm were compounded in a constituting ratio of 80% by weight, 16% by weight and 4% by weight (in terms of solid), respectively, then a silica dispersing agent (modified acrylic block copolymer, BYK Additives & Instruments, DISPERBYK2008) (15 parts by weight to 100 parts by weight of silica) and a carbon black dispersing agent (a macromolecular copolymer having a pigment-affinitive group, BYK Additives & Instruments, BYK9077) (50 parts by weight to 100 parts by weight of carbon black) were added thereto and the mixture was uniformly dispersed using a three-roll mill whereupon a black resin composition solution was prepared.

The black resin composition solution prepared as mentioned above was applied to a PET film of 100 µm thickness using a knife coater and subjected to an initial drying at 90° C. for 8 minutes. Then the light-shielding film detached from the PET film was subjected to a heating treatment in an inert gas oven under nitrogen of a flow rate of 20 L/minute at 230° C. for 3 hours, then at 280° C. for 3 hours and, after that, at 300° C. for 1 hour. The solvent in the resulting film was completely removed and the film thickness in the final completely dried state was 20 µm.

Characteristics of the resulting light-shielding film and the contents of the polyamide-imide resin, the carbon black and the silica in the light-shielding film are shown in Table 1.

Incidentally, the ratios by weight of the polyamide-imide resin, the carbon black and the silica in Table 1 are expressed after converting into the ratios when the sum of the polyamide-imide resin, the carbon black and the silica is defined as 100% by weight.

Examples 2 to 4 and Comparative Examples 1 to 5

A light-shielding film was prepared according to the same manner as in Example 1 except that the contents of the polyamide-imide resin, the carbon black and the silica were changed to those as shown in Table 1.

Characteristics of the resulting light-shielding film are shown in Table 1.

Examples 1 to 4 were excellent in terms of heat resistance (Tg), dimensional stability, light-shielding property, low glossiness (glossiness of side A, side B and cross section) and mechanical characteristics (strength, elongation and elastic modulus) and good results were achieved.

In Comparative Example 1, particle size of silica is small and, in Comparative Example 2, amount of silica is small whereby an object of the present invention is not achieved in terms of glossiness of sides A and B and the variation between them. An object of the present invention is not achieved in terms of the glossiness of the cross section as well.

In Comparative Example 3, compounding amount of silica is too much and, in Comparative Example 5, compounding amount of carbon black is too much whereby elongation and elastic modulus are low and the mechanical strength of the present invention is not fulfilled. In Comparative Example 4, amount of carbon black is small whereby the light-shielding property of the present invention is not fulfilled.

Example 5

A polyamide-imide resin being soluble in organic solvents synthesized from trimellitic acid anhydride (80 molar %), benzophenonetetracarboxylic acid di-anhydride (10 molar %), 3,3',4,4'-biphenyltetracarboxylic acid di-anhydride (10 molar %) and o-tolidine diisocyanate (100 molar %) was dissolved in N-methyl-2-pyrrolidone so as to make the polymer concentration 10%. The same operation as in Example 1 was conducted using this resin solution whereupon a black resin composition solution was prepared followed by manufacturing a light-shielding film.

Example 6

A polyamide-imide resin being soluble in organic solvents synthesized from trimellitic acid anhydride (70 molar %), benzophenonetetracarboxylic acid di-anhydride (10 molar %), 3,3',4,4'-biphenyltetracarboxylic acid di-anhydride (20 molar %) and o-tolidine diisocyanate (100 molar %) was dissolved in N-methyl-2-pyrrolidone so as to make the polymer concentration 10%. The same operation as in Example 1 was conducted using this resin solution whereupon a black resin composition solution was prepared followed by manufacturing a light-shielding film.

Example 7

A polyamide-imide resin being soluble in organic solvents synthesized from trimellitic acid anhydride (72.5 molar %),

TABLE 1

|  |  | Examples | | | | Comparative Examples | | | | |
|---|---|---|---|---|---|---|---|---|---|---|
|  |  | 1 | 2 | 3 | 4 | 1 | 2 | 3 | 4 | 5 |
| polyamide-imide resin | % by weight | 80 | 80 | 87 | 82 | 80 | 88 | 58 | 83 | 70 |
| carbon black | particle size (nm) | 24 | 24 | 24 | 24 | 24 | 24 | 24 | 24 | 24 |
|  | % by weight | 4 | 4 | 4 | 2 | 4 | 5 | 5 | 0 | 15 |
| silica | particle size (µm) | 3.9 | 6.7 | 3.9 | 3.9 | 0.02 | 3.9 | 3.9 | 3.9 | 3.9 |
|  | % by weight | 16 | 16 | 9 | 16 | 16 | 7 | 37 | 17 | 15 |
| film thickness (µm) |  | 20 | 20 | 20 | 20 | 20 | 20 | 20 | 20 | 20 |
| glossiness (side A) |  | 6 | 17 | 26 | 6 | 100 | 72 | 4 | 10 | 7 |
| glossiness (side B) |  | 11 | 21 | 32 | 9 | 111 | 120 | 8 | 18 | 14 |
| glossiness (cross section) |  | ○ | ○ | ○ | ○ | X | X | ○ | ○ | ○ |
| light-shielding property |  | ○ | ○ | ○ | ○ | ○ | ○ | ○ | X | ○ |
| Tg (° C.) |  | 330 | 328 | 324 | 319 | 320 | 330 | 325 | 330 | 325 |
| dimensional changing rate (%) |  | 0.02 | 0.03 | 0.02 | 0.02 | 0.02 | 0.07 | 0.02 | 0.03 | 0.08 |
| tensile test | strength (MPa) | 170 | 184 | 190 | 167 | 214 | 161 | 140 | 165 | 130 |
|  | elongation (%) | 20 | 21 | 22 | 21 | 15 | 10 | 5 | 20 | 5 |
|  | elastic modulus (GPa) | 5.4 | 5.8 | 6.1 | 5.5 | 6.5 | 5 | 4.4 | 5.3 | 4.3 | benzophenonetetracarboxylic acid di-anhydride (20 molar %), 3,3',4,4'-biphenyltetracarboxylic acid di-anhydride (7.5 molar %) and o-tolidine diisocyanate (100 molar %) was dissolved in N-methyl-2-pyrrolidone so as to make the polymer concentration 10%. The same operation as in Example 1 was conducted using this resin solution whereupon a black resin composition solution was prepared followed by manufacturing a light-shielding film.

Comparative Example 6

A polyester emulsion (an aqueous dispersion containing 30% by mass of solid) was dissolved in N-methyl-2-pyrrolidone so as to make the polymer concentration 10%. The same operation as in Example 1 was conducted using this resin solution to prepare a black resin composition solution. The solution was applied onto a PET film of 100 μm thickness using a knife coater and subjected to a heating treatment using an inert gas oven under the conditions of in nitrogen of a flow rate of 20 L/minute at 120° C. for 10 minutes to prepare a light-shielding film.

Characteristics of the resulting light-shielding film in Examples 5 to 7 and the contents of the polyamide-imide resin, the carbon black and the silica in the light-shielding film are shown in Table 2. The contents of the polyester resin, the carbon black and the silica in Comparative Example 6 are also shown in Table 2. Incidentally, the ratios by weight of the polyamide-imide resin (polyester in case of Comparative Example 6), the carbon black and the silica in Table 2 are expressed after converting into the ratios when the sum of the polyamide-imide resin (polyester in case of Comparative Example 6), the carbon black and the silica is defined as 100% by weight.

TABLE 2

|  |  | Examples | | | Comparative Example |
|---|---|---|---|---|---|
|  |  | 5 | 6 | 7 | 6 |
| polyamide-imide resin (* polyester resin) | % by weight | 80 | 80 | 80 | 80* |
| carbon black | particle size (nm) | 24 | 24 | 24 | 24 |
|  | % by weight | 4 | 4 | 4 | 4 |
| silica | particle size (μm) | 3.9 | 6.7 | 3.9 | 3.9 |
|  | % by weight | 16 | 16 | 16 | 16 |
| film thickness (μm) |  | 20 | 20 | 20 | — |
| glossiness (side A) |  | 12 | 5 | 6 | — |
| glossiness (side B) |  | 17 | 9 | 11 | — |
| glossiness (cross section) |  | ○ | ○ | ○ | — |
| light-shielding property |  | ○ | ○ | ○ | — |
| Tg (° C.) |  | 305 | 339 | 320 | — |
| dimensional changing rate (%) |  | 0.04 | 0.03 | 0.03 | — |
| tensile test | strength (MPa) | 170 | 180 | 200 | — |
|  | elongation (%) | 21 | 20 | 15 | — |
|  | elastic modulus (GPa) | 5.2 | 5.5 | 6.5 | — |

Examples 5 to 7 were excellent in terms of heat resistance (Tg), dimensional stability, light-shielding property, low glossiness (glossiness of side A, side B and cross section) and mechanical characteristics (strength, elongation and elastic modulus) and good results were achieved.

In Comparative Example 6, a single layer film cannot be prepared and an object of the present invention is not achieved.

INDUSTRIAL APPLICABILITY

In accordance with the light-shielding film of the present invention, it is possible to prepare a light-shielding film being excellent in heat resistance, dimensional stability, low glossiness and light-shielding property and having little variation in light-shielding property on both sides and cross section and in the thickness direction.

Accordingly, it can be advantageously used as an antireflective layer, etc. for aperture stop and shutter blades installed in a lens unit for digital video camera, mobile phone, onboard camera, etc., aperture stop for projector, aperture blade for aperture stop device for light quantity adjustment, optical instrument parts and insulating substrate which are briskly demanded for miniaturization, weight reduction and performance enhancement. Thus it is now possible to fulfill the demands for miniaturization, weight reduction and performance enhancement of those instruments.

The invention claimed is:

1. A light-shielding film, comprising a polyamide-imide resin, a black filler having an average particle size of 0.01 to 1 μm and inorganic particles having an average particle size of 0.1 to 10 μm,
   wherein the film is in a single layer structure;
   the content of the polyamide-imide resin is 55 to 91% by weight and the polyamide-imide resin comprises trimellitic acid anhydride, benzophenonetetracarboxylic acid di-anhydride and biphenyltetracarboxylic acid di-anhydride as an acid component and 3,3'-dimethyl-4,4'-diaminobiphenyl or a diisocyanate corresponding thereto as an amine component;
   the content of the black filler having the average particle size of 0.01 to 1 μm is 1 to 10% by weight; and
   the content of the inorganic particles having the average particle size of 0.1 to 10 μm is 8 to 35% by weight.

2. The light-shielding film according to claim 1, wherein the black filler is carbon black.

3. The light-shielding film according to claim 1, wherein the inorganic particles are silica.

4. The light-shielding film according to claim 1, wherein the inorganic particles are silica subjected to a surface treatment with silicone oil and/or a silane coupling agent.

5. The light-shielding film according to claim 1, wherein the film further comprises a dispersing agent for the black filler and/or the inorganic particles.

6. The light-shielding film according to claim 5, wherein the amount of the dispersing agent to 100 parts by weight of the black filler and/or the inorganic particles is 1 to 50 part(s) by weight.

7. The light-shielding film according to claim 1, wherein the light-shielding film has a thickness of 5 to 100 μm.

8. The light-shielding film according to claim 1, wherein the light-shielding film further comprises two sides and the sides have a glossiness measured in accordance with a method for measuring a mirror plane glossiness according to JIS Z8741-1997 of not more than 40.

* * * * *